(12) United States Patent
Traversat et al.

(10) Patent No.: US 10,373,139 B2
(45) Date of Patent: *Aug. 6, 2019

(54) JAVA STORE TELEVISION

(71) Applicant: Oracle America, Inc., Redwood Shores, CA (US)

(72) Inventors: Bernard A. Traversat, Menlo Park, CA (US); Mohamed M. Abdelaziz, Santa Clara, CA (US); Michael J. Duigou, Berkeley, CA (US); Henry Jen, San Jose, CA (US); Brian Goetz, Williston, VT (US)

(73) Assignee: Oracle America, Inc., Redwood City, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/462,915

(22) Filed: Mar. 20, 2017

(65) Prior Publication Data

US 2017/0193476 A1    Jul. 6, 2017

Related U.S. Application Data

(63) Continuation of application No. 13/273,861, filed on Oct. 14, 2011, now Pat. No. 9,626,488.
(Continued)

(51) Int. Cl.
*H04L 9/32*        (2006.01)
*G06Q 20/12*    (2012.01)
(Continued)

(52) U.S. Cl.
CPC ........... *G06Q 20/1235* (2013.01); *G06F 8/60* (2013.01); *G06F 21/10* (2013.01); *G06F 21/105* (2013.01);
(Continued)

(58) Field of Classification Search
CPC .... G06F 21/10; G06F 8/60; G06F 2221/0713; H04L 63/08; H04L 2209/603; H04L 63/442
See application file for complete search history.

(56) References Cited

U.S. PATENT DOCUMENTS 5,917,912 A  *  6/1999  Ginter .................... G06F 21/10
                                                            348/E5.006
7,069,293 B2 *  6/2006  Cox ..................... H04L 67/1095
                                                            709/203
(Continued)

*Primary Examiner* — Linglan E Edwards
(74) *Attorney, Agent, or Firm* — Fish IP Law, LLP

(57) ABSTRACT

A non-transitory computer readable storage medium including computer readable code that, when executed by a processor, is configured to receive, from a user network device, a first request to execute an application on the user network device. The first request includes a user identification, routing information, and requested application information, encrypted using a public key. The user network device is configured to display the application on a television display device. The code is further configured to decrypt the routing information and requested application information using a private key, send a second request for subscription information to a service provider, receive the subscription information from the service provider, and determine that a license corresponding to the application is associated with the user. The code is further configured to generate and send an application package configured to deploy the application using a Java Runtime Environment on the user network device.

16 Claims, 12 Drawing Sheets

Related U.S. Application Data

(60) Provisional application No. 61/393,688, filed on Oct. 15, 2010.

(51) Int. Cl.
*G06F 21/10* (2013.01)
*G06F 8/60* (2018.01)
*H04L 29/06* (2006.01)

(52) U.S. Cl.
CPC ............ H04L 9/32 (2013.01); H04L 63/0442 (2013.01); *G06F 2221/0713* (2013.01); *G06Q 2220/18* (2013.01); *H04L 63/08* (2013.01); *H04L 2209/603* (2013.01)

(56) References Cited

U.S. PATENT DOCUMENTS

| | | | | |
|---|---|---|---|---|
| 7,162,538 | B1* | 1/2007 | Cordova | G06F 8/61 709/238 |
| 7,203,738 | B1* | 4/2007 | McGill | G06F 8/60 709/219 |
| 8,069,468 | B1 | 11/2011 | Shah et al. | |
| 8,099,364 | B2 | 1/2012 | Padhye et al. | |
| 8,656,184 | B2* | 2/2014 | Miyazawa | G06F 8/658 713/191 |
| 2002/0013772 | A1 | 1/2002 | Peinado | |
| 2002/0032763 | A1* | 3/2002 | Cox | H04L 67/1095 709/223 |
| 2003/0037327 | A1* | 2/2003 | Cicciarelli | G06F 8/61 717/178 |
| 2003/0154387 | A1* | 8/2003 | Evans | G06F 21/10 713/193 |
| 2005/0028206 | A1* | 2/2005 | Cameron | H04N 7/17309 725/46 |
| 2006/0173974 | A1 | 8/2006 | Helms et al. | |
| 2007/0180519 | A1 | 8/2007 | Boccon-Gibod et al. | |
| 2008/0040716 | A1 | 2/2008 | Lam et al. | |
| 2008/0112405 | A1 | 5/2008 | Cholas et al. | |
| 2009/0138876 | A1* | 5/2009 | Chang | G06F 8/60 717/176 |
| 2010/0313226 | A1 | 12/2010 | Cholas et al. | |
| 2011/0179268 | A1* | 7/2011 | Strom | G06F 21/121 713/156 |

* cited by examiner

JAVA STORE TELEVISION

This application is a continuation of U.S. patent application Ser. No. 13/273,861, filed Oct. 14, 2011, which claims priority to U.S. provisional patent application No. 61/393,688, filed on Oct. 15, 2010. U.S. patent application Ser. No. 13/273,861, U.S. provisional patent application No. 61/393,688, and all other extrinsic references contained herein are incorporated by reference in their entirety.

BACKGROUND

Software developers are constantly creating new applications around the country, and even around the world. Software development may be accomplished using a variety of platforms, including, but by no means limited to, Java™ and Java™ (Java® and JavaFX® are registered trademarks owned by Sun Microsystems, Inc., Mountain View, Calif.). When a new application is developed, the developer must find a way to make the application available to those users interested in the application. This may be accomplished, for example, by soliciting users who may be interested in such an application. The developer may, for example, distribute copies of the application via a removable storage device, such as a CD-ROM. Problem—Solution

SUMMARY

In general, in one aspect, the invention relates to a non-transitory computer readable storage medium including computer readable code that, when executed by a processor, is configured to receive, from a user network device, a first request to execute an application on the user network device, where the first request comprises a user identification, routing information, and requested application information, where the routing information and requested application information is encrypted using a public key, and where the user network device is configured to display the application on a television display device. The computer readable code is further configured to decrypt the routing information and requested application information using a private key, send a second request for subscription information corresponding to the user to a service provider, wherein the second request comprises the user identification, receive the subscription information from the service provider, and determine that a license corresponding to the application is associated with the user identification. The computer readable code is further configured to generate an application package, where the application package is configured to deploy the application using a Java Runtime Environment (JRE) on the user network device, and send the application package to the user network device.

In general, in one aspect, the invention relates to a service provider, including a processor a memory, comprising instructions, which when executed by the processor perform a method, the method comprising: receiving a first request from a user network device for a public key, generating the public key and a private key, sending the public key to the user network device, sending the private key to a warehouse, receiving a second request for subscription information from the warehouse comprising a user identification, identifying the subscription information associated with the user identification, and sending the subscription information to the warehouse. The warehouse, in response to receiving the subscription information is configured to determine that a license corresponding to an application is associated with the user identification, generate an application package, wherein the application package is configured to deploy the application using a Java Runtime Environment (JRE) on the user network device, and send the application package to the user network device.

In general, in one aspect, the invention relates to a non-transitory computer readable storage medium comprising computer readable code that, when executed by a processor, is configured to send a first request for a public key to a service provider. The service provider is configured to generate a public key and a private key, and send the private key to a warehouse. The computer readable code is further configured to receive the private key from the service provider, and send, to the warehouse, a second request to execute an application. The second request includes a user identification, routing information, and requested application information, where the routing information and requested application information is encrypted using a public key. The warehouse is configured to decrypt the routing information and requested application information using the private key, send a third request for subscription information corresponding to the user to a service provider, where the third request comprises the user identification, receives the subscription information from the service provider, determines that a license corresponding to the application is associated with the user identification, and generates an application package. The application package is configured to deploy the application using a Java Runtime Environment (JRE) on the user device. The computer readable code is further configured to receive the application package, execute the application package, and display the application on a television display device.

DETAILED DESCRIPTION

Figure 1A:
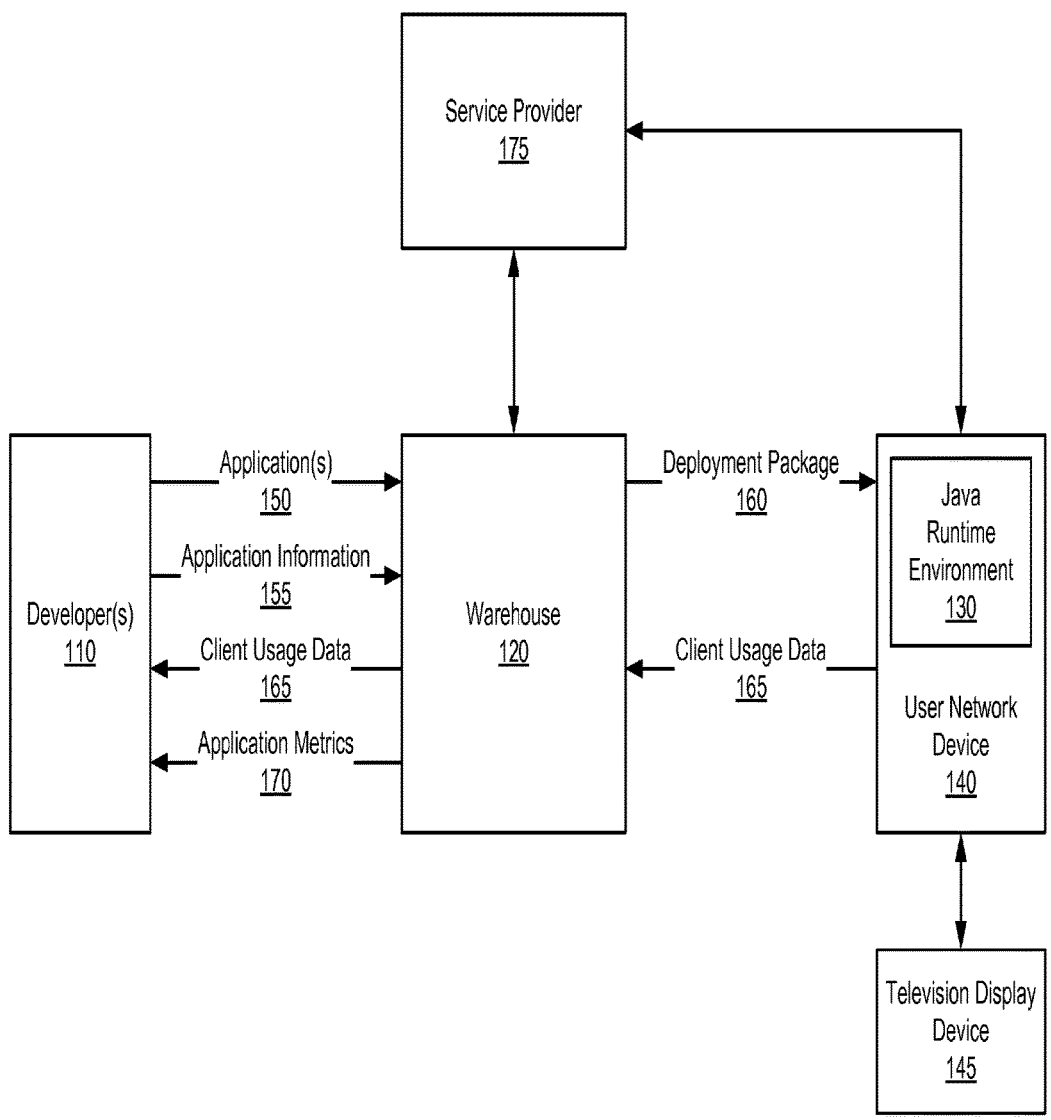
FIGS. 1A-1C show systems in accordance with one or more embodiments of the invention.

Specific embodiments of the invention will now be described in detail with reference to the accompanying figures. Like elements in the various figures (also referred to as Figs.) are denoted by like reference numerals for consistency.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to obtaining and executing on a user network device, applications stored in a warehouse. More specifically, embodiments of the invention relate to obtaining applications (e.g., Java or JavaFX applications) capable of executing in the Java Runtime Environment (JRE) and displaying the applications on a television display device. According to one or more embodiments of the invention, this involves verifying a user's television subscription, and generating an application package such that the application is rendered for a television display device.

In one embodiment of the invention, the applications, once complied, are in a byte-code format. The compiled applications are configured to execute on a Java Virtual Machine (JVM). In one or more embodiments of the invention, the JVM is stored in a user network device operatively connected to a service provider, such as a television service provider, and a television display device. More specifically, the JVM includes functionality to launch the execution of the JRE and allow the application to execute within the JRE. According to one or more embodiments of the invention, the user network device is any device that includes a JRE, and is operatively connected to a television display device. In one example, the user network device is a set top box. In another example, the user network device is a television that includes a JRE. Yet another example is a computer or Blu-Ray™ player that includes a JRE connected to a television. (Blu-Ray™ is a trademark owned by the Blu-Ray Disc Association.) The execution of the applications include reading and verifying byte-code, determining the corresponding native-platform machine code, and issuing the corresponding native-platform machine code to the client device OS and/or hardware. In one embodiment of the invention, the JVM may implement one or more "sandboxes", where each sandbox is an isolated execution environment within the JRE. Applications executing within a sandbox may only interact with the JVM and other applications within the sandbox; however, the applications may interact with applications executing outside the sandbox. Further, the JVM may place further restrictions on how applications may execute within a given sandbox.

FIG. 1A shows a system in accordance with one embodiment of the invention. The system includes one or more application developers (110), a warehouse (120), a user network device (140), a television display device (145), and a service provider (175). Each of these components is discussed below.

In one embodiment of the invention, the developers (110) generate, create, or otherwise provide applications (150). According to one or more embodiments of the invention, the applications may be, but are not limited to, Java (any edition, version) and JavaFX applications. The developers then provide these applications (150) to the warehouse (120) for distribution. In addition, according to one or more embodiments of the invention, the developers (110) provide the warehouse (120) with application information (155) (i.e., data related to the application).

According to one or more embodiments of the invention, the developers (110) also receive data from the warehouse (120) regarding applications that have been submitted (i.e., Application (150)). According to one or more embodiments of the invention, this data may include client usage data (165), and application metrics (170). According to one or more embodiments of the invention, client usage data (165) may correspond to data (e.g., without any personal identification information) detailing how a given application was/is used on one or more user network device (140). According to one or more embodiments of the invention, the client usage data (165) may include such information as how often users started and/or stopped an application (150), what pages are accessed by a user, the order in which the user navigated through the various pages in the application, how the pages were accessed, how the user interacted with the user interface (e.g., which buttons where clicked by the user, etc.) and time spent on accessing pages. In addition, the developers (110) may receive application metrics (170).

According to one or more embodiments of the invention, application metrics (170) may include the number of times an application has been installed or reinstalled, the number of times the application has been viewed, the number of times the application has been removed by a user, and the number of times the application has resulted in a catastrophic error (i.e., the application "crashed"). According to one or more embodiments of the invention, application metrics (170) are generated by the warehouse (120), as described below.

In one embodiment of the invention, the warehouse (120) corresponds to one or more computer systems (e.g., servers) configured to interface with the developers and the user network device (140). Generally, according to one or more embodiments of the invention, the warehouse (120) receives applications from the developer (110) and provides them to users by providing them to a user network device (140). According to one or more embodiments of the invention, the application (150) is provided to the warehouse (120) packaged in a standard Java Archive (JAR) file. The warehouse is configured to store one or more applications (150). Further, the warehouse may store different versions (e.g., version 1, version 1.1, version 2, etc.) of the same application, where each version includes different features and/or content. For example, according to one or more embodiments of the invention, different versions of the application may be stored for various screen sizes and input capabilities (e.g., touch-screen, physical keyboard input, track ball input, etc.). In addition, the warehouse (120) may store multiple instances of a given version of an application, where each instance of the application is configured to be deployed on a different type of user network device (140) (e.g., one instance for a set top box, one instance for deployment on a smart television, etc.). Further, in one embodiment of the invention, the warehouse (120) includes functionality to support the embodiments described in one or more of FIGS. 4-11. An embodiment of the warehouse is described in FIG. 2.

According to one or more embodiments of the invention, the warehouse (120) is configured to use the client usage data (165) to generate trends on how an application (150) is used, and subsequently send the generated trends to the developer (110). Alternatively, or in addition to the above, the warehouse (120) may be configured to send the client usage data (165) to the developer (110). In one embodiment of the invention, the client usage data (165) is an aggregation of the client usage data obtained from a number of individual user network devices executing the application. In one embodiment of the invention, application metrics (170) include other information tracked by the warehouse other than client usage data. For example, the application metrics (170) may indicate the number of times a given application was previewed (described below in FIG. 7), the number of times a given application was installed on a user network device, the types of user network devices (140) on which the application is currently stored, etc.

The warehouse (120) is configured to communicate with the developers (110) and the user network device (140) over a wired network, a wireless network, or any combination thereof. Further, the warehouse (120) and the user network device (140) may communicate over a wired network, a wireless network, or any combination thereof. According to one or more embodiments of the invention, upon receiving the application (150) and the application information (155), the warehouse (120) may package the application in a deployment package (160) that is made available to users. According to one or more embodiments of the invention, a developer (110) and a user of a user network device (140) may interact with the warehouse (120) using an interface displayed on the television display device (145).

In one embodiment of the invention, the user network device (140) is configured to receive the application as a deployment package (160) from the warehouse (120). In one embodiment of the invention, the deployment package (160) conforms to the Java Network Launch Protocol (JNLP) such that the application may be executed using the Web Start feature of JNLP. In one embodiment of the invention, the user network device also supports JavaFX, which is used to obtain client usage data (165) associated with the execution of applications in the JRE on the user network device (140).

In one embodiment of the invention, a user network device (140) is any device upon which a JRE may execute, and which is operatively connected to a television display device (145). Said another way, each user network device (140) includes a Java Runtime Environment (130). According to one or more embodiments of the invention, a user accesses applications from the warehouse (120) using the user network device (140). Examples of user network devices (140) include, but are not limited to, a set top box, a smart television, etc. According to one or more embodiments of the invention, a set top box is a device including a processor, a memory, and a persistent storage, which is used to connect to a television service provider and display television programming on a television display device (145). Further, according to one or more embodiments of the invention, a smart television is a television that includes a processor, a memory, persistent storage, and includes the functionality to receive and decode broadcast signals, which are then displayed on the television display device (145). Further, according to one or more embodiments of the invention, a smart television includes a direct internet connection. A smart television will be described in further detail in FIG. 12B, below. However, according to one or more embodiments of the invention, the user network device (140) may be any device that includes a JRE, and is configured receive and decode broadcast signals to display on a television display device (145). According to one or more embodiments of the invention, the television display device (145) may be a cathode ray tube (CRT) device, a light-emitting diode (LED) display, a plasma display panel (PDP), a liquid crystal display (LCD), organic light-emitting diode display (OLED), surface-conduction electron-emitter display (SED), Laser TV, a nanocrystal display, or any other display device used to display broadcast signals.

According to one or more embodiments of the invention, the user network device (140) is configured to connect to a service provider (175). According to one or more embodiments of the invention, the service provider is a television service provider (175) (i.e., a provider of broadcast television). Accordingly, in order to receive broadcast television, the user network device (140), must connect to the service provider (175). According to one or more embodiments of the invention, the service provider (175) stores user information associated with the user network device (140), and provides connectivity to the warehouse (120). According to one or more embodiments of the invention, in order to receive an application (150) from the warehouse (120), the warehouse (120) must first determine that the user network device (140) is authorized to receive the application (150) by contacting the service provider (175). This is described in greater detail in FIG. 8.

Figure 1B:
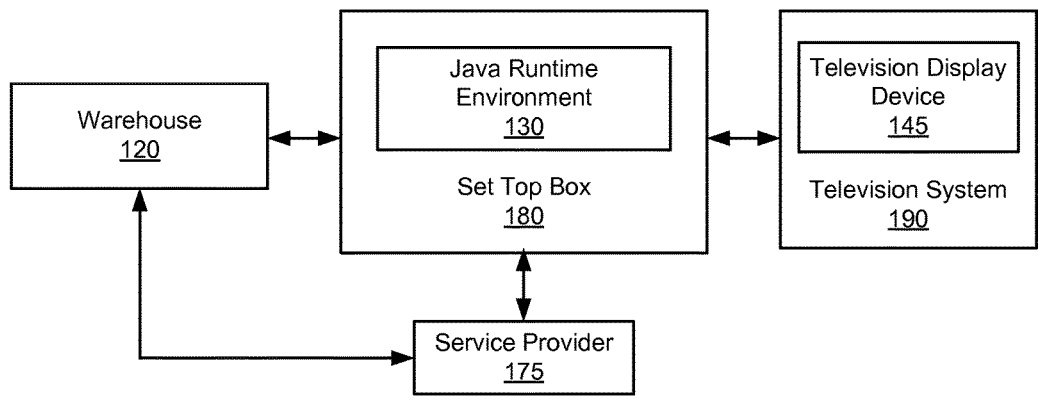

FIG. 1B shows another example system, according to one or more embodiments of the invention. Again, this system includes a warehouse (120), and a service provider (175). However, this example system also includes a set top box (180) and a television system (190). As described above, a user may connect to the warehouse (120) through any device that includes a JRE, and is operatively connected to a television display device (145). In this example, it is the set top box (180), which includes the JRE (130), and is connected to the television system (190), which includes the television display device (145). Accordingly, what is considered the user network device (140) in FIG. 1A is the set top box (180) in FIG. 1B. As shown it is the set top box (180) that communicates with the service provider (175) and the warehouse (120).

Figure 1C:
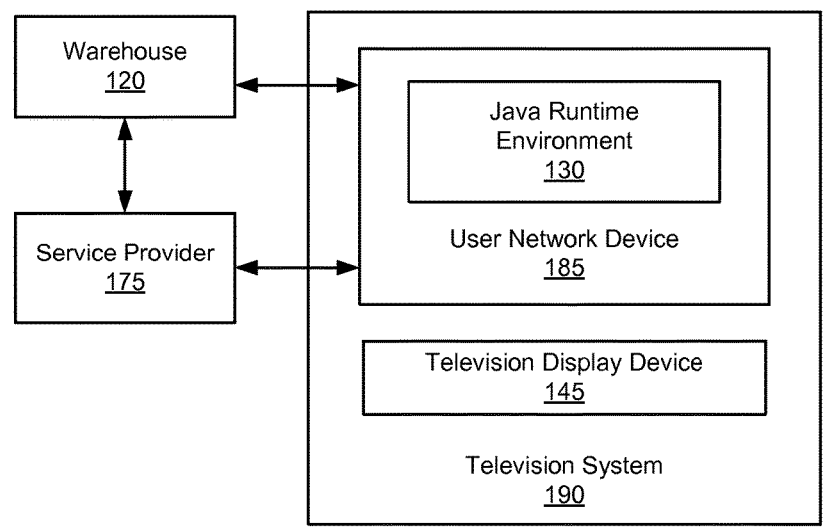

FIG. 1C shows another example system, according to one or more embodiments of the invention. Again, this system includes a warehouse (120), and a service provider (175). However, this example system also includes a television system (190). In this example, the television system (190) communicates directly with the warehouse (120) and service provider (175) through a user network device (185). Accordingly, what is considered the user network device (140) in FIG. 1A is the user network device (185) in FIG. 1C. Although not shown in FIG. 1B, a user network device is any device that connects to a service provider (175) and warehouse (120), and includes a JRE. Thus, the term user network device will be used throughout the description to identify such a component, which may be found in any embodiment of the invention.

Figure 2:
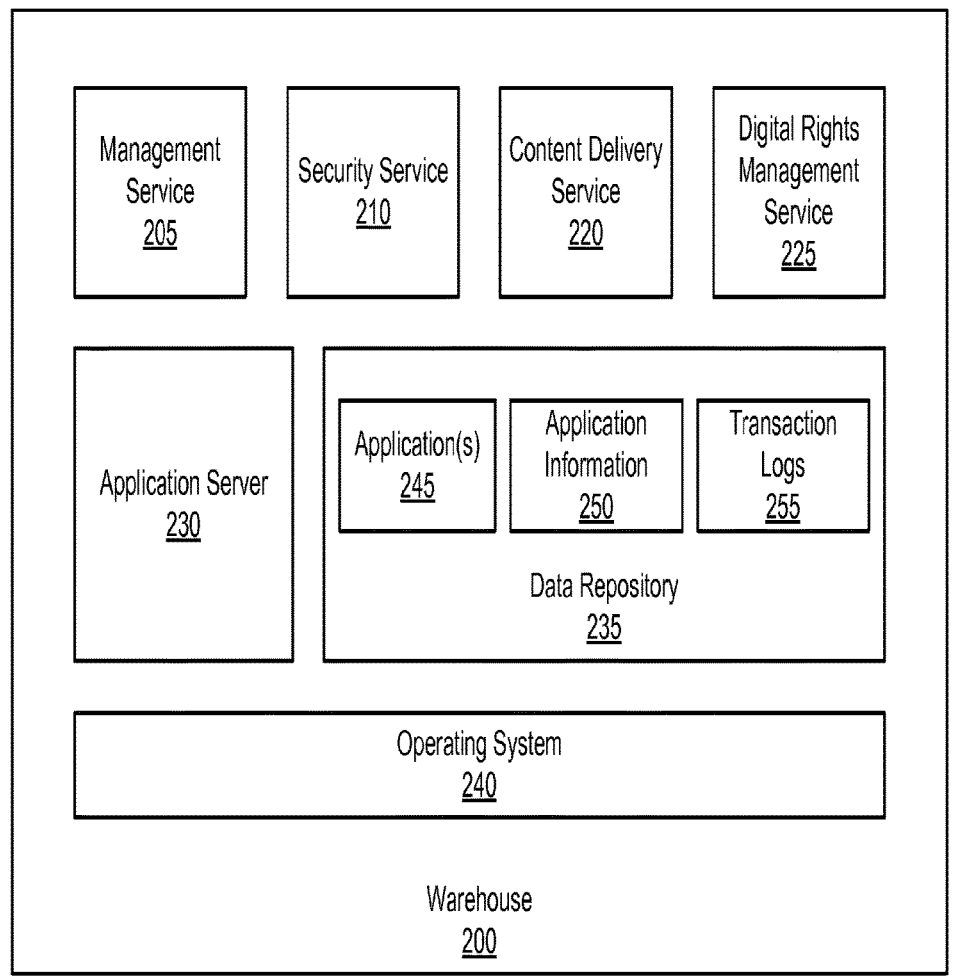
FIG. 2 shows the architecture of the warehouse in accordance with one or more embodiments of the invention.

FIG. 2 shows the architecture of the warehouse (200) (i.e., warehouse (120) of FIG. 1A) in accordance with one embodiment of the invention. The warehouse (200) includes an operating system (OS) (240), e.g., Solaris™, Linux™, Unix™, Windows™, or any other operating system (Solaris® is registered trademarks owned by Sun Microsystems, Inc., Mountain View, Calif.; Linux® is a registered trademark owned by Linus Tourvalds, Santa Clara, Calif.; Unix® is a registered trademark of The Open Group; and Windows® is a registered trademark owned by the Microsoft Corporation, Redmond, Wash.). The OS (240) executes an application server (230) (e.g., Glassfish) which is configured to host the application programming interfaces (APIs) to the services provided by the warehouse (200).

In one embodiment of the invention, the warehouse (200) includes a management service (205), a security service (210), a content delivery service (220), and a digital rights management service (225). Each of these services is described below.

In one embodiment of the invention, the management service (205) provides warehouse administration services (accessed via a universal resource locator (URL)) including configuration of the warehouse hardware and software. For example, according to one or more embodiments of the invention, the management service (205) is configured to track developers that are submitting content to the warehouse (200). According to one or more embodiments of the invention, the management service (205) is configured to track the purchase transactions and/or deployment of applications. According to one or more embodiments of the invention, the management service (205) is configured to manage the display of applications in the catalogue to the consumer. Finally, according to one or more embodiments of the invention, the management service (205) manages the state of submitted content to the warehouse (200) (e.g., submitted, approved, under review, published, or quarantined).

In one embodiment of the invention, the security service (210) includes functionality to manage security issues related to providing applications, including interacting with a service provider (i.e., service provider (175) of FIG. 1A). According to one or more embodiments of the inventions, the security service (210) may include a number of mappings, including a mapping between a user's identification and a private key to use to decrypt requests, a mapping between a user identification and licenses that are available to that user identification, and a mapping between subscription information and license mapping, which ensures that users with a certain subscription are allowed access to applications with certain licenses. These mappings are discussed in greater detail in FIG. 3.

In one embodiment of the invention, the content delivery service (220) provides users with a portal (accessed via a URL) to (i) view applications (245) in the warehouse (200), (ii) package the applications for delivery to the client devices for install or preview using JNLP, (iii) manage application versions and instances, (iv) manage billing and invoicing (as necessary), (v) respond to requests to confirm that a given client device includes the latest version of a given application, (vi) to track which applications are installed by each user on their client devices (e.g., user A loaded application 1 on their mobile device), and (v) maintain user account information (e.g., username, password, etc.). According to one or more embodiments of the invention, the content delivery service (220) includes functionality to interact with a service provider (i.e., service provider (175) of FIG. 1A), in order to provide billing information to the service provider.

In one embodiment of the invention, the digital rights management service (225) includes functionality to set digital rights management (DRM) settings for a given application, a particular user, a particular client device type, or any combination thereof. For example, the DRM settings may specify, but are not limited to specifying: (i) where the application may execute (e.g., on what system the application may execute), (ii) whether a given instance of the application may be copied to multiple client devices, (iii) what features of the application the user may access, and (iv) the duration for which the application (or a given feature of the application) is available. Further, according to one or more embodiments of the invention, the DRM settings may provide the ability to track the type of license that the consumer has purchased. For example, the consumer may purchase a perpetual license, a subscription license, or a per content access license. According to one or more embodiments of the invention, certain subscriptions with a service provider may provide certain licenses that do not need to be purchased separately.

According to one or more embodiments of the invention, the digital rights management service (225) may include a mapping between subscription information and licenses. According to one or more embodiments of the invention, the DRM service (225) prohibits users from copying an application and using it on a different system without purchasing a valid license. According to one or more embodiments of the invention, the DRM management service also verifies the level of access available to a user on a particular application (e.g., if the application is a game that includes 5 levels but the user only has a license to access levels 1-3, then the DRM may enforce this restriction).

In one embodiment of the invention, the executable code for the applications (245), the application information (250), and the transaction logs (255) are stored in a data repository (235) in the warehouse (200). In one embodiment of the invention, the data in the data repository (235) is managed by a file system, such as ZFS, Network File System (NTFS), Universal Disk Format (UDF), or any other file system (or combination thereof). In addition, as an alternative, one or more of the executable codes for the applications (245), the application information (250), and the transaction logs (255) may be stored in a content delivery network (i.e., a geographically distributed storage network) to facilitate efficient transmission of applications, etc. to the consumers. In such embodiments, the warehouse (200) includes functionality to access the content delivery network and manage the data stored in the content delivery network.

In one embodiment of the invention, the application information (250) is stored in the data repository (235) as an Extensible Mark-up Language (XML) file. Those skilled in the art will appreciate that the application information may be stored in a format other than (or in combination with) XML. According to one or more embodiments of the invention, the developers also provide the warehouse with application information related to the submitted application. According to one or more embodiments of the invention, the application information may include, but is not limited to, an application name, a subtitle, a description, a category, license requirements (e.g., perpetual, subscription, or free), and a price. However, this application information may also be provided, for example, by the service provider. According to one or more embodiments of the invention, the subtitle is a short description of the invention that accompanies the application name. According to one or more embodiments of the invention, the description may be a popup description or a full description. Further, according to one or more embodiments of the invention, the application information (250) could include a popup description as well as a full description. According to one or more embodiments of the invention, the popup description will appear when a user hovers over an icon associated with the application in a display. Regarding the full description, according to one or more embodiments of the invention, the full description is made available to users who request more information about an application. Regarding the category, according to one or more embodiments of the invention, a developer chooses a descriptive term from a preexisting list that describes the application (i.e., "Social Networking," "Sports," "Finance," etc.). According to one or more embodiments of the invention, the application information may include other information, such as a help page uniform resource locator ("URL"), one or more icons associated with the application (245), and screenshots of the application (245).

Figure 3:
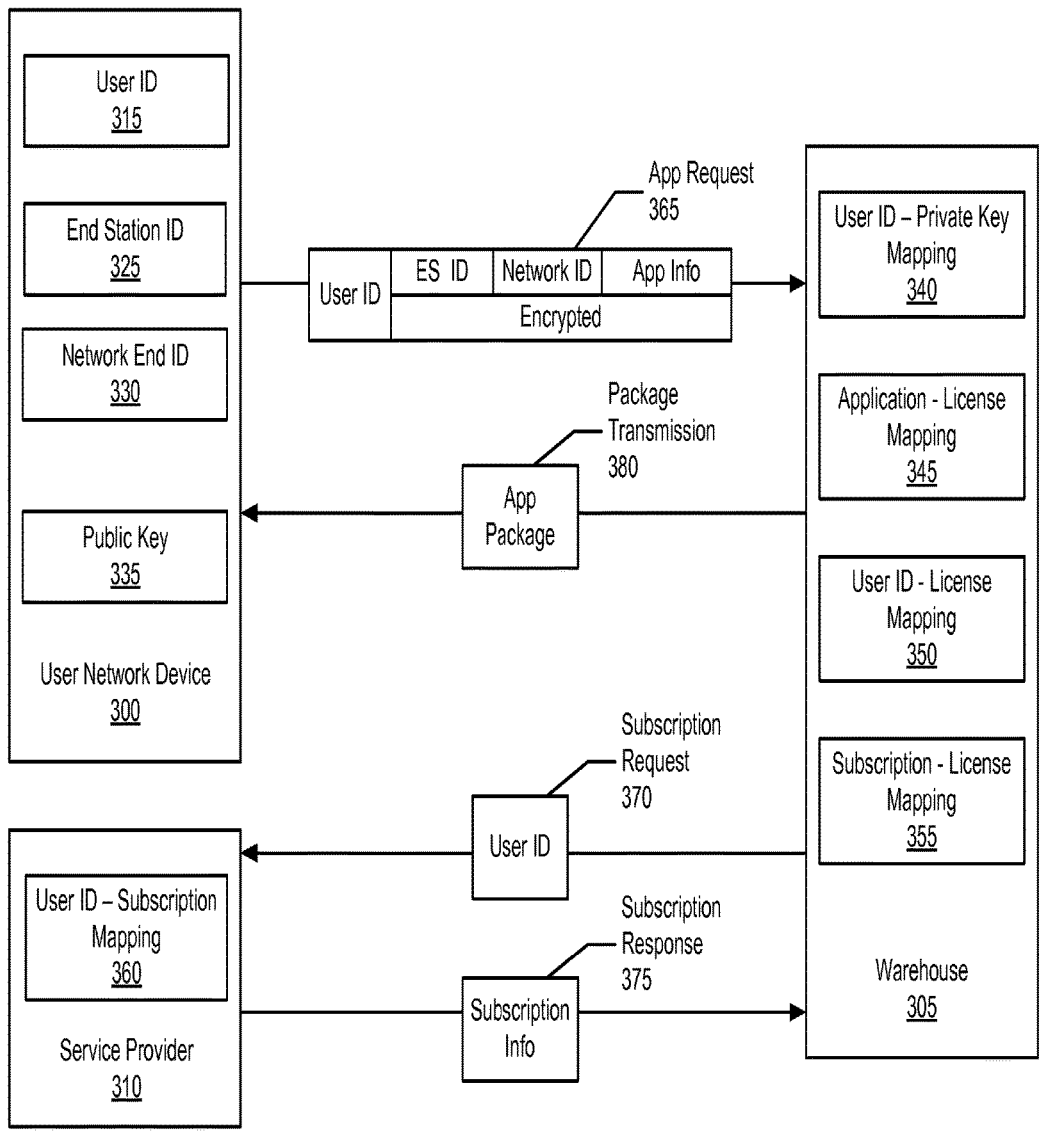
FIG. 3 shows a system in accordance with one or more embodiments of the invention.

FIG. 3 shows an example system according to one or more embodiments of the invention. Specifically, FIG. 3 illustrates what information is stored in each component of the system, and how data travels between the components. FIG. 3 includes a user network device (300), a warehouse (305), and a service provider (310). The components of each are discussed below.

According to one or more embodiments of the invention, the user network device (300) includes information used to identify the user of the device, as well as identifying information for the device itself and routing information. In one embodiment of the invention, the identifying information may include, for example, a user identification (315). According to one or more embodiments of the invention, routing information includes an end station identification (325) and a network end identification (330), both of which may be stored in the user network device (300). According to one or more embodiments of the invention, an end state identification is a unique identifier assigned to devices such as cable boxes or set top boxes within a consumer household. According to one or more embodiments of the invention, a network end identification is a unique network identifier for each device, such as a cable box or set top box, within an internal cable distribution network. According to one or more embodiments of the invention, the network end identification may be an internet protocol (IP) address for TCP/IP networks. Those skilled in the art will appreciate that an end station identification and a network end identification may be necessary to transmit a request to the warehouse (305). Finally, the user network device (300) may also include a public key (335), used to encrypt messages sent to the warehouse (305). The public key is described in greater detail in FIG. 6.

According to one or more embodiments of the invention, the warehouse (305) may include a number of mappings. These mappings may be stored in a computer readable storage device. According to one or more embodiments of the invention, these mappings include a user identification (UID) to private key mapping (340). According to one or more embodiments of the invention, user identification (UID) to private key mapping (340) allows the warehouse (305) to identify a user identification in a request and determine a private key to use to decrypt the message. The warehouse (305) may also include an application to license mapping (345). According to one or more embodiments of the invention, application to license mapping (345) is used to determine licenses that are required to access a particular application stored in the warehouse. The warehouse (305) may also include a subscription to license mapping (355). According to one or more embodiments of the invention, a user may have certain licenses that come with a subscription with the service provider (310) and this information is stored in the subscription to license mapping (355). For example, a user's television service may come with specific applications already available. In another example, the user may have a subscription to HBO in addition to basic cable and this subscription may include applications that HBO has created to compliment their movie or show offerings. In this example, if the show is about pirates, then HBO may create a video game application based on pirates. This application may be then available as part of the HBO subscription.

Returning to the discussion of FIG. 3, according to one or more embodiments of the invention, the service provider (310) may provide numerous subscriptions to users, and each of these subscriptions may allow varied access to applications in the warehouse (305). The warehouse (305) may also include a user identification to license mapping (350). According to one or more embodiments of the invention, user identification to license mapping (350) is used to identify licenses that are associated with a specific user. For example, the user associated with the user identification may have purchased licenses separately from their subscription.

According to one or more embodiments of the invention, the service provider (310) includes a mapping between a user identification and a subscription (360). Said another way, the service provider (310) tracks subscription information for a particular user.

According to one or more embodiments of the invention, in order to obtain access to an application, the user network device (300) initially sends an app request (365) to the warehouse (305). According to one or more embodiments of the invention, the app request (365) includes a user identification, end station identification, network end identification, and requested application information. According to one or more embodiments of the invention, everything but the user identification is encrypted using the public key.

According to one or more embodiments of the invention, the warehouse (305) receives the app request (365), identifies the user identification, obtains the private key associated with the user identification from the user identification private key mapping (340), and decrypts the application request (365). The warehouse (305) then sends a subscription request (370) to the service provider (310) in order to determine the subscription associated with the user.

According to one or more embodiments of the invention, the service provider (310) identifies the subscription information using the user identification subscription mapping (360). The service provider (310) returns the subscription information (375) to the warehouse (305).

According to one or more embodiments of the invention, the warehouse (305) determines that, based on the user's subscription information (375), the user has a license for the requested application. Thus, the warehouse (305) generates an application package (380), and sends the application package (380) to the user network device (300). According to one or more embodiment of the invention, the warehouse (305) may identify a specific version of the application based on the end station identification. Further, according to one or more embodiments of the invention, the warehouse (305) sends the application package (380) to the user network device (300) using the routing information, such as the end station identification and the network end identification. According to one or more embodiments of the invention, the routing information may also include other device identification.

Figure 4:
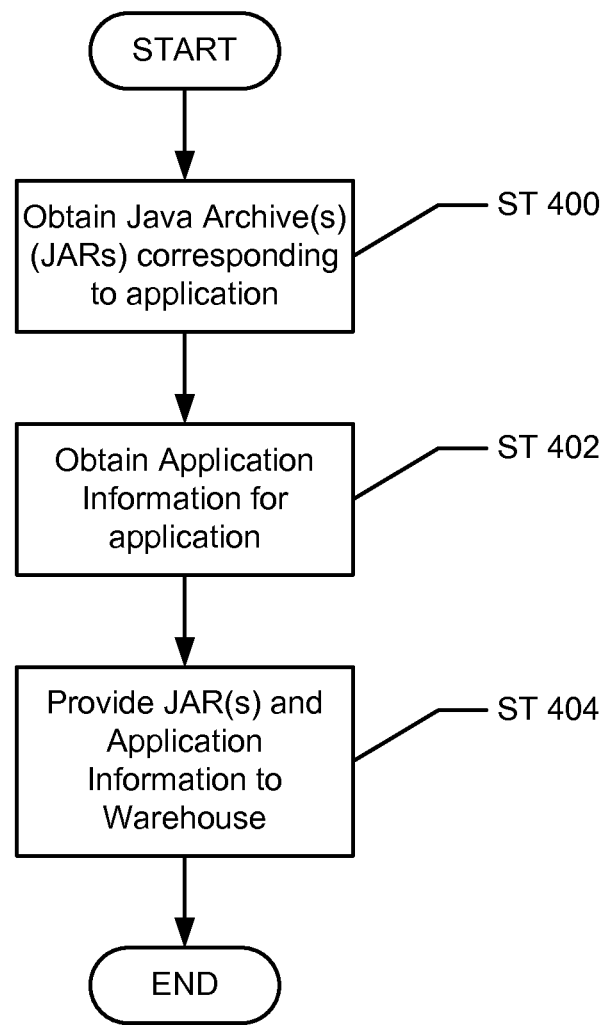
FIGS. 4-9 show methods in accordance with one or more embodiments of the invention.

FIG. 4 shows a method in accordance with one or more embodiment of the invention. More specifically, FIG. 4 shows a method for providing an application to the warehouse from a developer. While the various steps in the flowchart are presented and described sequentially, one of ordinary skill will appreciate that some or all of the steps may be executed in different orders, may be combined, or omitted, and some or all of the steps may be executed in parallel.

At ST 400, one or more Java Archives (JARs) for the application are obtained (generated, or created, etc) by a developer (or other third-party providing applications to the warehouse). At ST 402, the application information for the application is obtained. In one embodiment of the invention, the application information may be obtained (generated, or created) using any known mechanisms in the art including completing a web-based form, providing a text document, providing an XML document, etc. At ST 404, the JAR(s) and the corresponding application information are provided to the warehouse. According to one or more embodiments of the invention, the application and application information are provided to the warehouse by sending them across a network.

Figure 5:
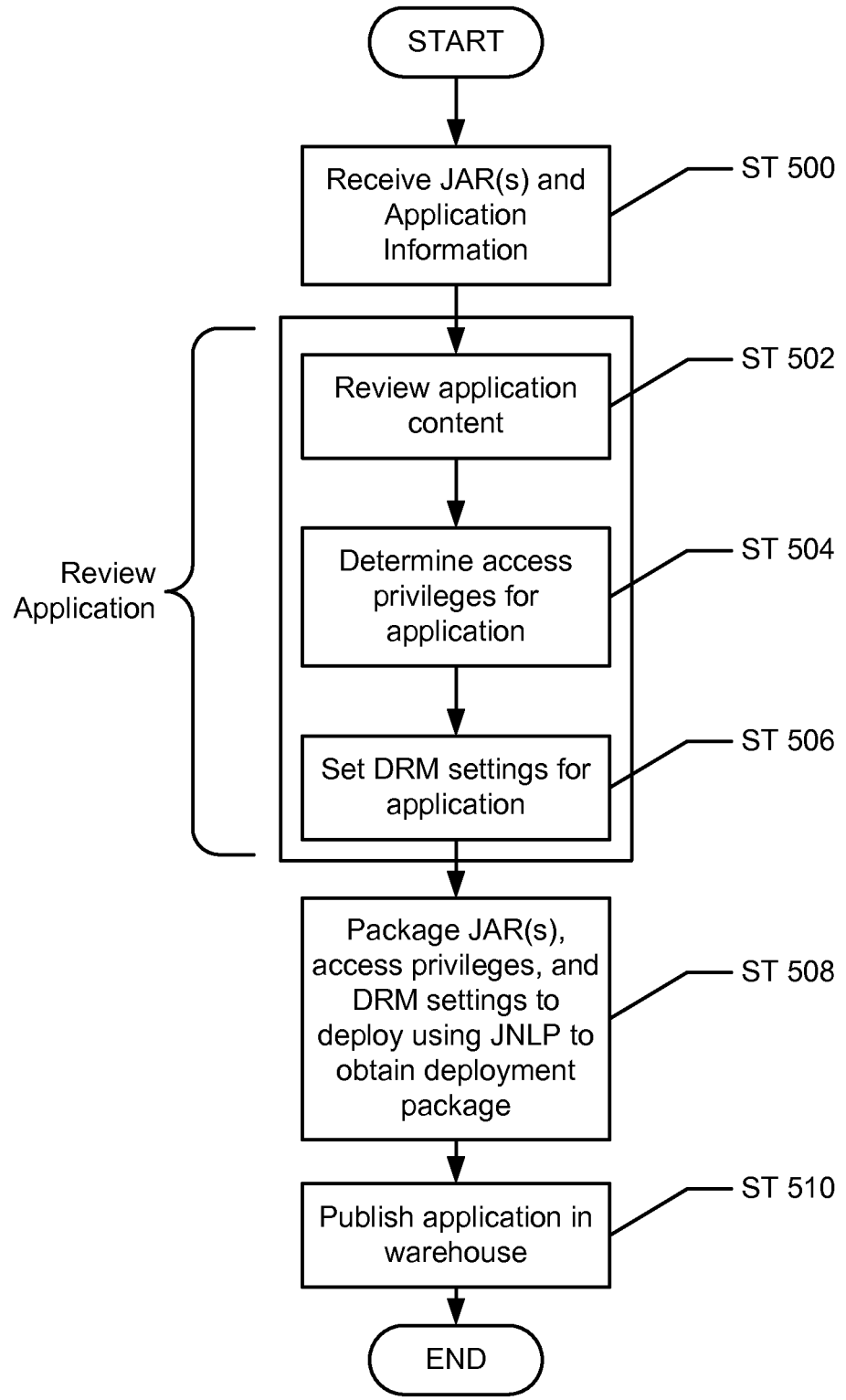

FIG. 5 shows a method in accordance with one or more embodiments of the invention. More specifically, FIG. 5 shows a method for reviewing an application provided in FIG. 4 (or by another mechanism) to the warehouse. While the various steps in the flowchart are presented and described sequentially, one of ordinary skill will appreciate that some or all of the steps may be executed in different orders, may be combined, or omitted, and some or all of the steps may be executed in parallel.

At ST 500, the JAR and corresponding application information are received. At ST 502, the content (e.g., textual, graphical, and/or audio content) of the application is reviewed. In one embodiment of the invention, the content of the application may be reviewed by a reviewer via the application reviewer service. According to one or more embodiments of the invention, the text of the content submission is reviewed manually, and the JAR is reviewed automatically to check for viruses and to verify the code. According to one or more embodiments of the invention, the JAR and corresponding application information may be verified either manually or automatically (for example using emulators).

At ST 504, the access privileges for the application are determined. The access privileges may be determined, in part, from the application information. Further, the access privileges may be determined, in part, using rules specified by (or accessible to) the application reviewer service. In one embodiment of the invention, the access privileges may specify any level of granularity. For example, the access privileges may be (i) sandbox-only execution (i.e., the application may only execute within the sandbox, (ii) limited access execution outside a sandbox on a client device (i.e., the application may access a specified subset of the resources/data/peripherals outside of the sandbox), and (iii) full access execution on the client device.

At ST 506, the DRM settings for the application are set. The DRM settings may specify any type of DRM restrictions on the application. For example, according to one or more embodiments of the invention, DRM restrictions may be placed on the application that allow a user to merely access a preview of the application before the application is purchased. Another example is that DRM restrictions may be placed on an application that limit the number of times the application may be accessed, or set a time limit for how long an application is accessible. In one embodiment of the invention, the ST 506 may be performed by the DRM service.

At ST 508, the JAR(s), access privileges, and DRM settings are packaged for deployment using JNLP. In one embodiment of the invention, the warehouse includes the functionality to perform all the necessary action required at ST 508. Those skilled in the art will appreciate that the packaging may include creating multiple instances of the deployment package, where each instance of the deployment package is created for a specific type of user network device (e.g., one instance for deployment directly on a television system, one instance for deployment on a set top box, etc.). At ST 510, the application is published in the warehouse (i.e., the application may be installed or previewed by user network devices). According to one or more embodiments of the invention, a published application is accessible through the content delivery service of the warehouse. In one embodiment of the invention, ST 508-ST 510 may be performed by the content delivery service.

Figure 6:
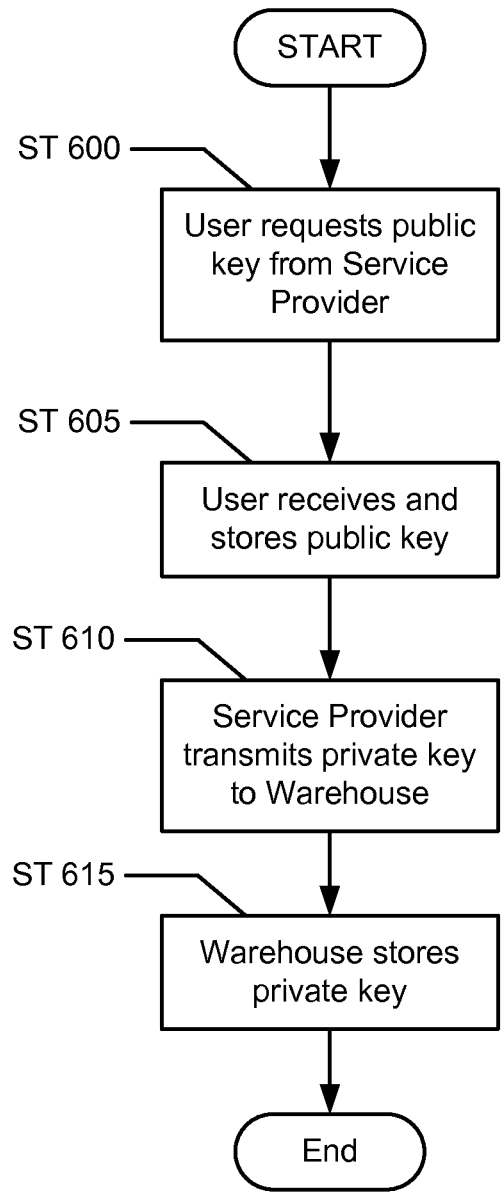

FIG. 6 shows a method according to one or more embodiments of the invention. Specifically, FIG. 6, shows a method of exchanging public and private keys between the user network device, service provider, and warehouse. While the various steps in the flowchart are presented and described sequentially, one of ordinary skill will appreciate that some or all of the steps may be executed in different orders, may be combined, or omitted, and some or all of the steps may be executed in parallel.

At ST 600, a user requests a public key from the service provider. According to one or more embodiments of the invention, the public key is requested from a device such as a smart television or a set to box. According to one or more embodiments of the invention, the service provider is configured to generate public and private keys to distribute to user client devices and the warehouse. In one embodiment of the invention, the public key may be pre-loaded on the user network device prior to deploying the device to the user. Alternatively, the public key may be transferred from the service provider to the user network device using a different communication channel than the channel used to communicate the request to the service provider.

At ST 605, the user receives and stores the public key. According to one or more embodiments of the invention, the public key is associated with a subscription the user has with the service provider. Thus, according to one or more embodiments of the invention, regardless of how many user network devices are covered by a user's subscription, the user may use the same public key. According to one or more embodiments of the invention, the public key may also be associated with a particular device. For example, if a user has more than one user network device associated with a single subscription, the service provider may generate a separate public key for each device, according to one or more embodiments of the invention.

At ST 610, the service provider transmits a private key to the warehouse. According to one or more embodiments of the invention, the service provider transmits the private key along with the user identification, such that the warehouse may create a mapping between the private key and the user identification (e.g., user identification private key mapping (340) from FIG. 3). At ST 615, the warehouse stores the private key. According to one or more embodiments of the invention, the private key is stored in the user identification private key mapping. Thus, the warehouse may identify the proper private key to use to decrypt a package using the user identification.

Figure 7:
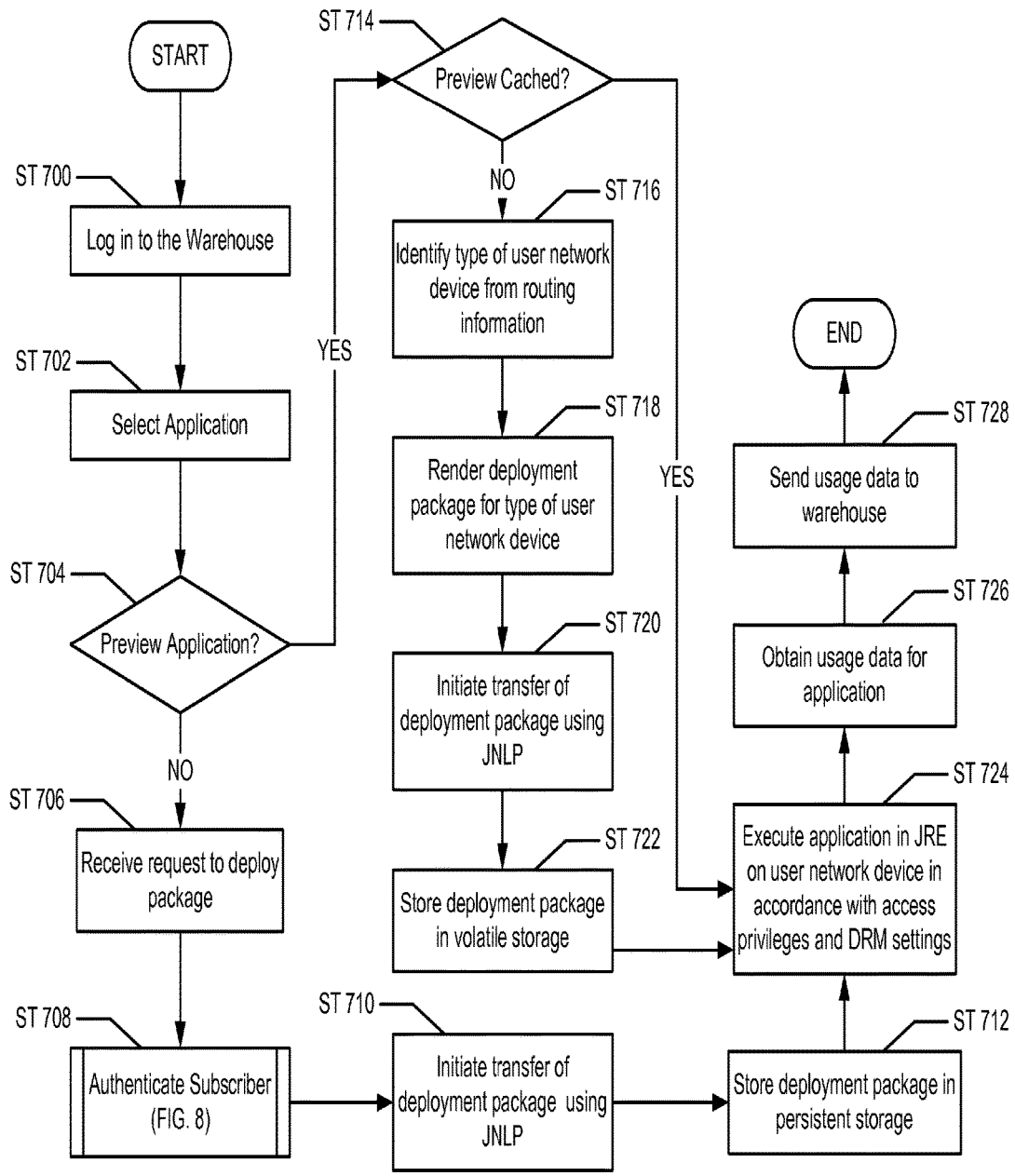

FIG. 7 shows a method in accordance with one or more embodiment of the invention. More specifically, FIG. 7 shows a method for previewing or installing an application on a user network device. While the various steps in the flowchart are presented and described sequentially, one of ordinary skill will appreciate that some or all of the steps may be executed in different orders, may be combined, or omitted, and some or all of the steps may be executed in parallel.

At ST 700, a user logs into the warehouse, for example, using the content delivery service. In one embodiment of the invention, the user may access the warehouse via a web-browser (e.g., Firefox™, Google Chrome™, Internet Explorer™, or any microbrowser, minibrowser, or wireless internet browser) and/or via another application installed on the user network device (Firefox® is a registered trademark owned by Mozilla, Inc., Mountain View, Calif.; Google Chrome® is a trademark owned by Google, Inc., Mountain View, Calif.; and Internet Explorer® is a registered trademark owned by Microsoft Corporation, Redmond, Wash.). For example, according to one or more embodiments of the invention, a user may access the warehouse using a menu provided by the service provider to browse and select available television programming.

At ST 702, an application is selected by the user via the user network device. At ST 704, a determination is made about whether the user wants to install the application or preview the application. If the application is to be installed, then method proceeds to ST 706. If the application is to be previewed, then the method proceeds to ST 714.

At ST 706, a request is received by the warehouse to deploy the application package. According to one or more embodiments of the invention, the request may be generated by the user using a remote control for the user network device (i.e., a television remote control or a remote control for a set top box). Those skilled in the art will appreciate that the deployment package may be requested by the user using other traditional input devices, such as a mouse or a keyboard configured to send and receive signals to and from the user network device. As described above, the request may include such information as a user identification, a set top box or other user network device identification, requested application information, and routing information, such as an end station identification and network end identification. This is described in greater detail above, in FIG. 3.

At ST 708, the subscriber (i.e., the subscription account associated with the user network device) is authenticated. This is described in greater detail in FIG. 8. At ST 710, transfer of the deployment package is initiated using JNLP. According to one or more embodiments of the invention, there may be multiple deployment packages for a particular application. The appropriate deployment package(s) may be determined using information from the request, such as the user network device identification. According to one or more embodiments of the invention, the deployment package is generated using the routing information (See FIG. 3) from the request.

At ST 712, the deployment package is stored in persistent storage. According to one or more embodiments of the invention, the user network device includes persistent storage where the deployment package is stored. According to one or more embodiments of the invention, this allows the user to deploy the package from the persistent storage rather than requesting the package from the warehouse a second time.

Returning to ST 704, if the user wishes to preview an application, it is not necessary to obtain the entire deployment package, according to one or more embodiments of the invention. The flowchart continues at ST 714. According to one or more embodiments of the invention, a user may have portions of applications or previews of applications cached in the user network device. This may reduce the need to transmit data between the user network device, warehouse, and service provider. According to one or more embodiments of the invention, a preview of the requested application may be cached in the user network device memory. If, at ST 714, a determination is made that a preview is not cached, then it is necessary to obtain a preview from the warehouse, and the flowchart continues at ST 716.

At ST 716, the user network device sends a request for the preview to the warehouse. Although not shown in the flowchart, the request may include the request may include such information as a user identification, a set top box or other user network device identification, requested application information, and routing information, such as an end station identification and network end identification. The warehouse identifies the type of user network device from the request.

At ST 718, the warehouse renders a deployment package for the type of user network device. For example, for a specific requested application, the warehouse may have a first version to deploy on set top boxes, and a second version to deploy directly on televisions. Thus, according to one or more embodiments of the invention, the warehouse renders the deployment package based on information identified in ST 716.

At ST 720, the warehouse initiates transfer of the deployment package to the user network device using JNLP. At ST 722, the user network device reeves the deployment package and stores it in volatile storage. According to one or more embodiments of the invention, the deployment package is stored in the temporary storage (or in a temporary manner) on the user network device. For example, the deployment package is stored in volatile memory and is only available on the client device until the JRE is closed and/or as specified in the DRM settings. Those skilled in the art will appreciate that the DRM settings for an application which are being previewed may be more restrictive then the DRM settings on an installed application.

Continuing from ST 722, ST 712, or, in the instance that a preview version of the application is cached at ST 714, the flowchart continues at ST 724. At ST 724, the application is executed in the JRE on the client in accordance with the access privileges and DRM settings. In one embodiment of the invention, when an application is previewed (e.g., following ST 714 or ST 722), the full application may be sent for previewing or, alternatively, a version with less functionality than the full application (i.e., the "preview version) may be sent to the client device. Further, once the previewing is complete—e.g., the user has used the application for a specified period of time, turns off the user network device, executes the JVM, then the application may rendered inaccessible to the user network device.

At ST 726, client usage data is obtained from the user network device (using, for example, JavaFX) related to the application usage on the user network device. The client usage data may include personal identification information (i.e., information which identifies the user of the client device or any other personal/confidential information of the user of the client device). The personal identification information (or portions thereof) may be removed from the client usage data prior to sending the data to the warehouse. Alternatively, the client usage data is sent to the warehouse with the personal identification information, at which point it is removed by the warehouse prior to sending the client usage data to the developer (or other third-party, which provided the application to the warehouse). At ST 728, the client usage data is sent to the warehouse.

Figure 8:
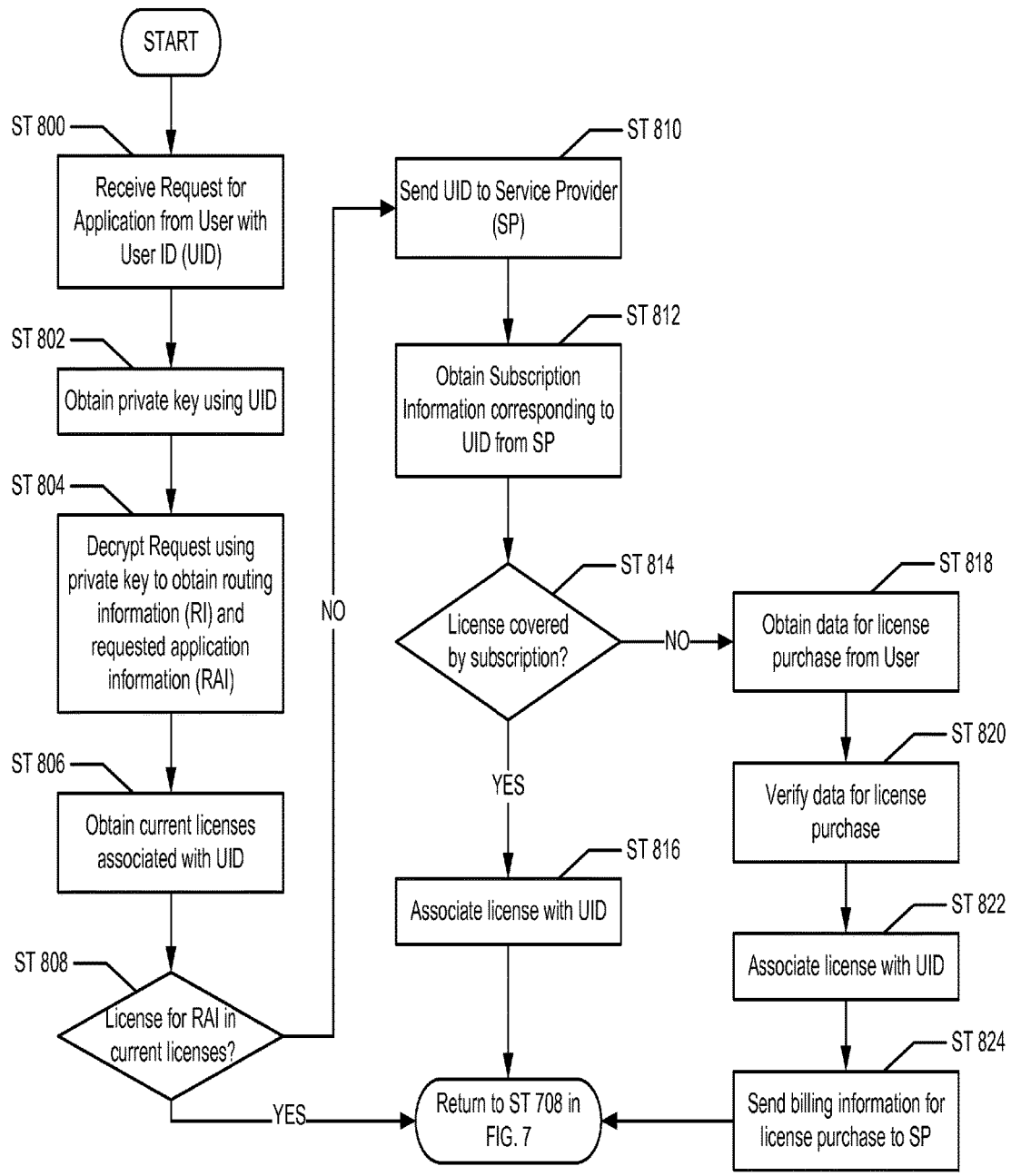

FIG. 8 shows a method in accordance with one or more embodiment of the invention. More specifically, FIG. 8 shows a method for authenticating a subscriber on a user network device. While the various steps in the flowchart are presented and described sequentially, one of ordinary skill will appreciate that some or all of the steps may be executed in different orders, may be combined, or omitted, and some or all of the steps may be executed in parallel. Further, according to one or more embodiments of the invention, the steps shown by this flowchart are intended to occur during ST 708 of FIG. 7.

At ST 800, the warehouse receives a request for an application from a user with a user identification. As described above, the request may include such information as a user identification, requested application information, and routing information, such as an end station identification and network end identification. This is described in greater detail in FIG. 3.

At ST 802, the warehouse obtains a private key corresponding to the user using the user identification. According to one or more embodiments of the invention, all items in the request, except for the user identification, may be encrypted using a user network device public key. Thus, according to one or more embodiments of the invention, the warehouse may identify the proper private key with which to decrypt the request using the user identification. For example, the proper private key may be indexed in a user identification private key mapping.

At ST 804, the warehouse decrypts the request using the private key to obtain routing information and requested application information. At ST 806, the warehouse obtains current licenses associated with the user identification. According to one or more embodiments of the invention, the warehouse uses a user identification-license mapping in order to determine which licenses a user currently has. At ST 808, the warehouse determines whether the license for the requested application is one of the licenses currently associated with the user identification. According to one or more embodiments of the invention, the warehouse may use a application license mapping to determine what license the application requires, as well as the current licenses associated with the user identification, as determined at ST 806.

At ST 808, a determination is made regarding whether the license for the requested application is one already associated with the user identification. If the license for the requested application is one already associated with the user identification, then the flowchart returns to ST 708 in FIG. 7. Otherwise, the flowchart continues at ST 810.

At ST 810, the warehouse sends the user identification to the service provider as a request for subscription information for the user. At ST 812, the service provider provides the subscription information to the warehouse. According to one or more embodiments of the invention, the service provider stores a user identification to subscription mapping.

At ST 814, a determination is made regarding whether the license for the application is covered by the user's subscription. According to one or more embodiments of the invention, the warehouse includes a subscription to license mapping, which details which licenses are included with which subscriptions. If it is determined that the license is covered by the user's subscription, then the flowchart continues at ST 816, and the license is associated with the user identification. According to one or more embodiments of the invention the warehouse stores this association as part of the user identification subscription mapping. Thus, according to one or more embodiments of the invention, if the user subsequently requests an application that uses the same subscription, the warehouse may identify the license as associated with the user identification, without communicating with the service provider.

Returning to ST 814, if the license is not covered by the user's subscription, then the user must acquire a license, and the flowchart continues at ST 818. At ST 818, the warehouse obtains data for the license purchase from the user. According to one or more embodiments of the invention, this may include such information as user information or financial information. At ST 820, the data is verified for the license purchase. For example, the warehouse may verify that the data for license purchase meets the entire cost of the license.

At ST 816, the license is associated with the user identification. According to one or more embodiments of the invention the warehouse stores this association as part of the user identification subscription mapping. Thus, according to one or more embodiments of the invention, if the user subsequently requests an application that uses the same subscription, the warehouse may identify the license as associated with the user identification, without communicating with the service provider. Finally, at ST 824, the billing information for the license purchase is sent to the service provider. According to one or more embodiments of the invention, the billing information may be included in the data for license purchase form the user. The flowchart then returns to ST 708 in FIG. 7.

Figure 9:
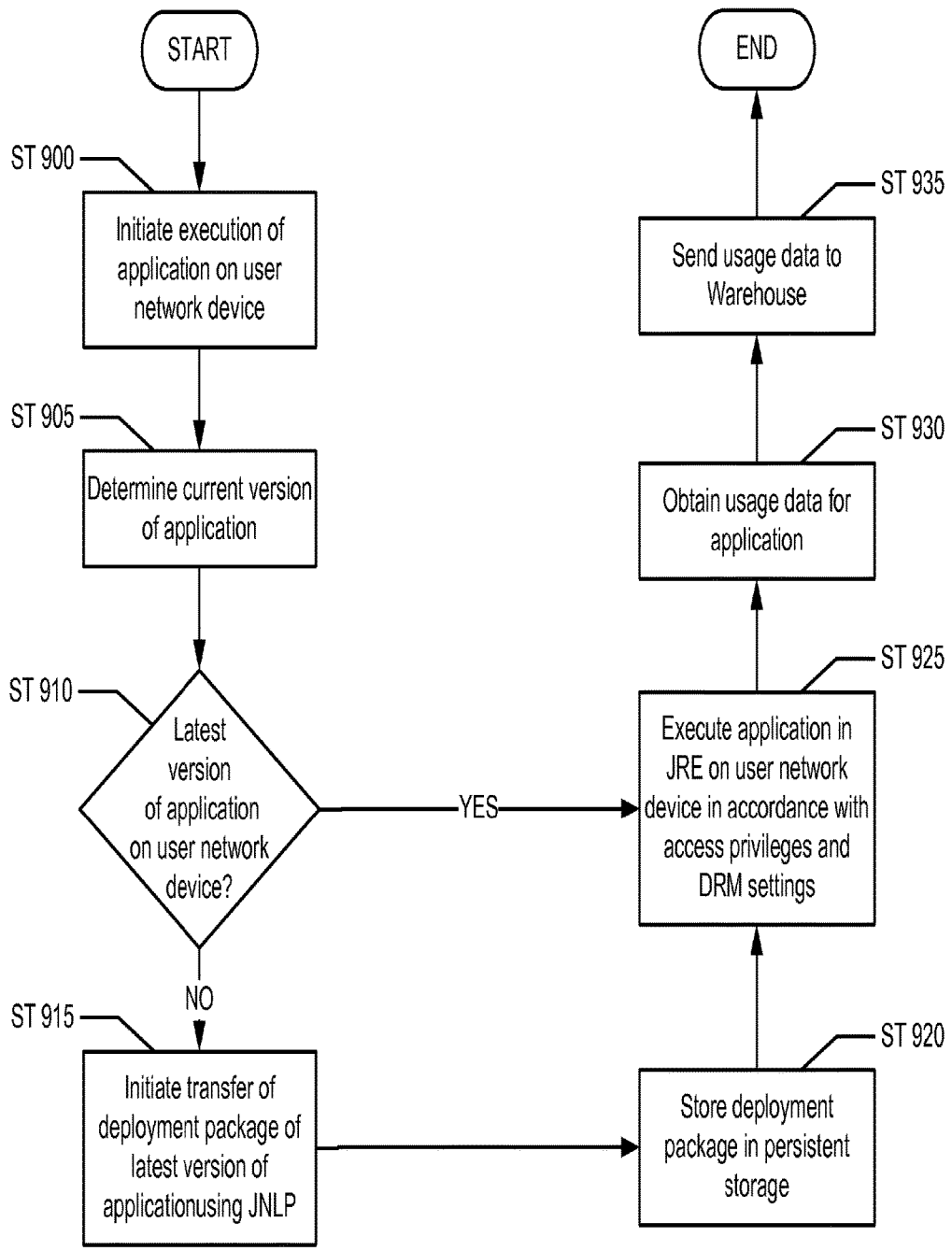

FIG. 9 shows a method in accordance with one or more embodiments of the invention. More specifically, FIG. 9 shows a method for executing an application previously installed on the user network device. While the various steps in the flowchart are presented and described sequentially, one of ordinary skill will appreciate that some or all of the steps may be executed in different orders, may be combined, or omitted, and some or all of the steps may be executed in parallel.

At ST 900, execution of the application is initiated on the client device using any known method of initiating an application (e.g., selecting an icon corresponding to the application, entering a command line instruction, etc.). At ST 905, the current version of the application on the user network device is determined (or otherwise obtained). At ST 910, a determination is then made about whether the version of the application on the user network device is the latest version, where the latest version is available in the warehouse. If the application on the user network device is the latest version, then the method proceeds to ST 925; otherwise, the method proceeds to ST 915. In one embodiment of the invention, a checksum is calculated for each version of the application using a checksum function (e.g., SHA1, MD5, etc.). In such embodiments, the determination in ST 910 is performed by comparing the checksum of the version of the application on the device with the checksum of the latest version of the application.

At ST 915, the deployment package (which may be user network device type specific) that includes the latest version of the application is transferred to the user network device using JNLP At ST 920, the deployment package is stored in the persistent storage on the client device. At ST 925, the application is executed in the JRE on the client in accordance with the access privileges and DRM settings.

At ST 930, client usage data is obtained from the client device (using, for example, JavaFX) related to the application usage on the client device. The client usage data may include personal identification information (i.e., information which identifies the user of the client device or any other personal/confidential information of the user of the client device). According to one or more embodiments of the invention, the client usage data may be cached locally on the client device and only transferred periodically. The personal identification information (or portions thereof) may be removed from the client usage data prior to sending the data to the warehouse. Alternatively, the client usage data is sent to the warehouse with the personal identification information, at which point it is removed by the warehouse prior to sending the client usage data to the developer (or other third-party, which provided the application to the warehouse). At ST 935, the client usage data is sent to the warehouse.

In one embodiment of the invention, a user may access the warehouse using different user network devices. In such cases, a user may have a common user account at the warehouse across all their user network devices and, as such, have rights to install the same application on each of the their user network devices. For example, if user A purchases and installs application 1 on their mobile phone and then subsequently accesses the warehouse from their laptop, user A may install application 1 on their desktop without purchasing an additional copy of application 1.

Figure 10:
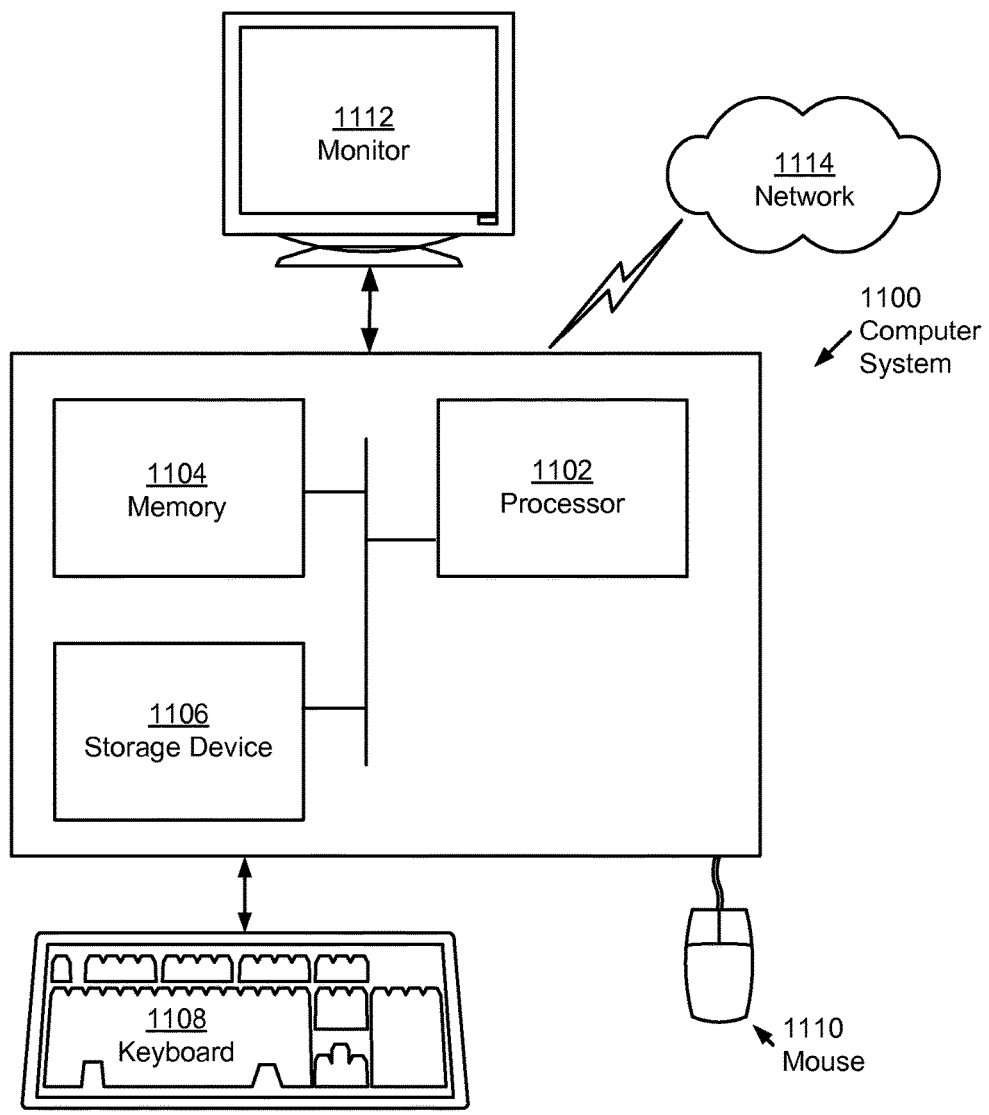
FIG. 10 shows a computer system in accordance with one or more embodiments of the invention.

Embodiments of the invention may be implemented on virtually any type of computer regardless of the platform being used. For example, as shown in FIG. 10, a computer system (1100) includes one or more processor(s) (1102), associated memory (1104) (e.g., random access memory (RAM), cache memory, flash memory, etc.), a non-transitory computer readable storage device (1106) (e.g., a hard disk, an optical drive such as a compact disk drive or digital video disk (DVD) drive, a flash memory stick, etc.), and numerous other elements and functionalities typical of today's computers (not shown). The computer (1100) may also include input means, such as a keyboard (1108), a mouse (1110), or a microphone (not shown). Further, the computer (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. For example, the computer system (1100) may be a server system having multiple blades. Generally speaking, the computer system (1100) includes at least the minimal processing, input, and/or output means necessary to practice embodiments of the invention.

Computer readable program code to perform embodiments of the invention may be stored on a non-transitory computer readable storage medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

Figure 11A:
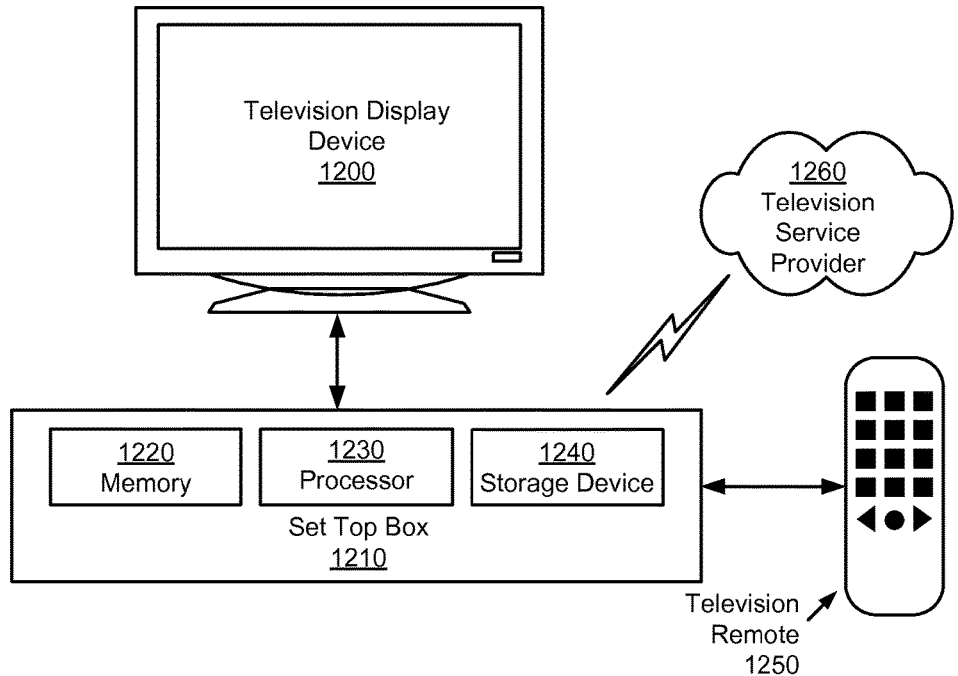
FIGS. 11A-11B show television systems in accordance with one or more embodiments of the invention.

Embodiments of the invention may also be implemented on virtually any type of user network device regardless of the platform being used. For example, as shown in FIG. 11A, a set top box (1210) includes one or more processor(s) (1230), associated memory (1220) (e.g., random access memory (RAM), cache memory, flash memory, etc.), a non-transitory computer readable storage device (1240) (e.g., a hard disk, an optical drive such as a compact disk drive or digital video disk (DVD) drive, a flash memory stick, etc.), and numerous other elements and functionalities typical of today's set top boxes (not shown). The set top box (1210) may also include input means, such as a television remote (1250). Further, the set top box (1210) may be operatively connected to a television display device (1200). According to one or more embodiments of the invention, the television display device (1200) may be a cathode ray tube (CRT) device, a light-emitting diode (LED) display, a plasma display panel (PDP), a liquid crystal display (LCD), organic light-emitting diode display (OLED), surface-conduction electron-emitter display (SED), Laser TV, carbon nanotubes, nanocrystal display, or any other display device used to display broadcast signals. The set top box (1210) may be configured to receive television broadcast signals from a television service provider (1260), for example, a cable provider.

Figure 11B:
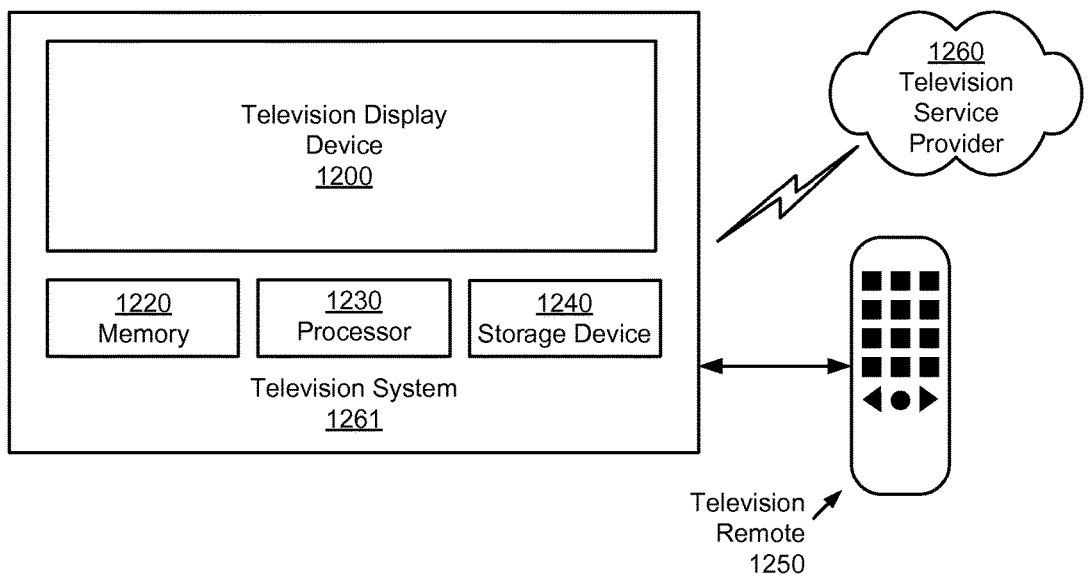

As another example, as shown in FIG. 11B, a television system (1261) includes one or more processor(s) (1230), associated memory (1220) (e.g., random access memory (RAM), cache memory, flash memory, etc.), a non-transitory computer readable storage device (1240) (e.g., a hard disk, an optical drive such as a compact disk drive or digital video disk (DVD) drive, a flash memory stick, etc.), and numerous other elements and functionalities typical of today's television devices (not shown). The set top box (1210) may also include input means, such as a television remote (1250). Further, the set top box (1210) may be operatively connected to a television display device (1200). According to one or more embodiments of the invention, the television display device (1200) may be a cathode ray tube (CRT) device, a light-emitting diode (LED) display, a plasma display panel (PDP), a liquid crystal display (LCD), organic light-emitting diode display (OLED), surface-conduction electron-emitter display (SED), Laser TV, a nanocrystal display, or any other display device used to display broadcast signals. The television system (1261) may be configured to receive television broadcast signals from a television service provider (1260), for example, a cable provider.

Computer readable program code to perform embodiments of the invention may be stored on a non-transitory computer readable storage medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

What is claimed is:

1. A system comprising:
a warehouse comprising a non-transitory computer-readable storage medium comprising computer-readable code that, when executed by a processor, causes the processor to:
receive, from a user network device, a first request to execute an application on the user network device, wherein the first request comprises a user identification, routing information, and requested application information, and wherein the user network device is configured to display the application on a display device;
determine that subscription information mapped to the user identification does not comprise a license corresponding to the application;
send a second request to the user network device, the second request comprising a request for license purchase data;
receive, from the user network device, the license purchase data in response to the second request;
obtain, from a service provider and on behalf of a user and using the license purchase data received from the user network device, a license corresponding to the application, wherein the license corresponding to the application provides access to the application;
associate the license corresponding to the application with the user identification;
generate, based on the association of the license corresponding to the application with the user identification, an application package, wherein the application package is configured to deploy the application using a runtime environment on the user network device; and
send the application package to the user network device.

2. The system of claim 1, wherein the computer-executable code, when executed by the processor, is further configured to:
prior to receiving the first request, receive a private key and the user identification from the service provider; and
generate a mapping between the received private key and the user identification.

3. The system of claim 2, wherein the routing information and requested application information in the first request are encrypted by a public key, and the computer-readable code, when executed by the processor, further causes the processor to:

determine the private key based on the user identification in the first request and the mapping of the private key to the user identification; and decrypt the routing information and requested application information using the private key.

4. The system of claim 1, wherein the user network device comprises a first portion of the application, and wherein the application package comprises a second portion of the application.

5. The system of claim 4, wherein the first portion of the application comprises a preview of the application having greater usage restrictions than a full version of the application.

6. The system of claim 1, wherein the user network device is one selected from a group consisting of a smart television and a set top box.

7. The system of claim 1, wherein the first request to execute the application is in response to a signal from a remote control.

8. The system of claim 1, wherein the computer-readable code, when executed by the processor, further causes the processor to generate the application package by setting a digital rights management (DRM) setting for the application, wherein the DRM setting is enforced by the runtime environment.

9. The system of claim 1, wherein the application package is generated in accordance with a network launch protocol.

10. The system of claim 1, wherein the computer-readable code, when executed by the processor, further causes the processor to generate the application package using an access privilege, wherein the access privilege is one selected from a group consisting of sandbox-only execution, limited access execution outside a sandbox on the user network device, and full access execution on the user network device.

11. The system of claim 1, wherein the application is a JAVA application.

12. The system of claim 1, wherein the service provider comprises:

a service provider memory, comprising instructions, which when executed by a service provider processor, cause the service provider processor to:

receive, from the warehouse, a third request, the third request comprising a request for subscription information and including the user identification;

identify the subscription information mapped to the user identification; and send the subscription information mapped to the user identification to the warehouse.

13. The system of claim 12, the service provider further comprising computer-readable code, when executed by the service provider processor, causes the service provider processor to:

receive license data from the warehouse; and associate the license with the user identification.

14. The system of claim 12, the service provider further comprising computer-readable code, when executed by the service provider processor, further causes the service provider processor to:

prior to receiving the third request, receive a public key request from the user network device;

generate a public key and a private key;

send the public key to the user network device; and send the private key and the user identification to the warehouse.

15. The system of claim 1, wherein the user network device comprises a non-transitory computer-readable storage medium comprising computer-readable code that, when executed by a user network device processor, causes the user network device processor to:

send, the first request to the warehouse;

receive the application package from the warehouse;

execute the application package; and display the application on the display device.

16. The system of claim 15, wherein the user network device further comprises computer-readable code that, when executed by the user network device processor, causes the user network device processor to:

prior to sending the first request to the warehouse, send a key request for a public key to the service provider;

receive the public key from the service provider; and encrypt the routing information and requested application information of the first request with the public key.

* * * * *

UNITED STATES PATENT AND TRADEMARK OFFICE
CERTIFICATE OF CORRECTION

PATENT NO. : 10,373,139 B2
APPLICATION NO. : 15/462915
DATED : August 6, 2019
INVENTOR(S) : Traversat et al.

Page 1 of 1

It is certified that error appears in the above-identified patent and that said Letters Patent is hereby corrected as shown below:

In the Drawings

On sheet 10 of 12, in FIG. 9, under Reference Numeral ST 915, Line 4, delete "applicationusing" and insert -- application using --, therefor.

In the Specification

In Column 1, Line 25, delete "Problem-Solution" and insert -- Problem-Solution. --, therefor.

In Column 13, Line 65, delete "device device." and insert -- device. --, therefor.

In Column 16, Line 25, delete "JNLP" and insert -- JNLP. --, therefor.

Signed and Sealed this
Twenty-eighth Day of July, 2020

Andrei Iancu
*Director of the United States Patent and Trademark Office*